United States Patent
Vasquez

(10) Patent No.: US 8,818,532 B1
(45) Date of Patent: Aug. 26, 2014

(54) SYSTEM AND METHOD FOR SELECTIVELY CONTROLLING AND MONITORING RECEPTACLES AND FIXTURES CONNECTED TO A POWER CIRCUIT IN A BUILDING

(76) Inventor: Ricardo Vasquez, Bensalem, PA (US)

( * ) Notice: Subject to any disclaimer, the term of this patent is extended or adjusted under 35 U.S.C. 154(b) by 291 days.

(21) Appl. No.: 13/217,221

(22) Filed: Aug. 24, 2011

(51) Int. Cl.
*G05B 11/01* (2006.01)
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC .......... 700/19; 700/17; 700/18; 700/20; 700/286; 700/297

(58) Field of Classification Search
USPC .................. 700/17–20, 286, 297
See application file for complete search history.

(56) References Cited

U.S. PATENT DOCUMENTS

| | | | | |
|---|---|---|---|---|
| 5,003,486 A | * | 3/1991 | Hendel et al. | 700/293 |
| 5,455,464 A | * | 10/1995 | Gosling | 307/31 |
| 6,018,690 A | * | 1/2000 | Saito et al. | 700/295 |
| 7,257,466 B2 | * | 8/2007 | Kreiner | 700/292 |
| 7,982,335 B2 | * | 7/2011 | Aldag et al. | 307/12 |
| 7,983,795 B2 | * | 7/2011 | Josephson et al. | 700/276 |
| 8,244,405 B2 | * | 8/2012 | Kao et al. | 700/286 |
| 8,442,792 B1 | * | 5/2013 | Elberbaum | 702/107 |
| 8,723,653 B2 | * | 5/2014 | Jansma | 340/10.5 |
| 2003/0227220 A1 | * | 12/2003 | Biskup et al. | 307/116 |
| 2009/0273334 A1 | * | 11/2009 | Holovacs et al. | 324/66 |
| 2010/0019575 A1 | * | 1/2010 | Verges | 307/38 |
| 2012/0089263 A1 | * | 4/2012 | Park et al. | 700/291 |

* cited by examiner

*Primary Examiner* — Ronald Hartman, Jr.
(74) *Attorney, Agent, or Firm* — LaMorte & Associates, P.C.

(57) ABSTRACT

A system for adding controls to an area circuit within a building. The system enables specific outlets and fixture switches in the area circuit to be automatically and individually controlled. Smart outlets and smart fixtures switches are used. Each has a receptacle, an internal on/off switch, and a selectively changeable address code. An electrical power cable extends throughout the area circuit. A control unit is coupled to the electrical power cable and generates an addressed control signal within the electrical power cable. The addressed control signal selectively controls the internal on/off switches in the smart outlets and the smart fixture switches. However, the addressed control signal generated by the control unit must be properly addressed to a smart outlet or a smart fixture switch.

16 Claims, 3 Drawing Sheets

SYSTEM AND METHOD FOR SELECTIVELY CONTROLLING AND MONITORING RECEPTACLES AND FIXTURES CONNECTED TO A POWER CIRCUIT IN A BUILDING

BACKGROUND OF THE INVENTION

1. Field of the Invention

In general, the present invention relates to systems and methods that control the supply of power to individual switches and outlets in a home or business. More particularly, the present invention relates to control systems that enable a user to selectively activate and deactivate individual fixtures in a particular circuit of a home or business.

2. Prior Art Description

In the United States, electrical power is typically provided to commercial and residential buildings as alternating current at 120 volts and 60 Hz. Within a home or building, power is divided into smaller area circuits. Power to each area circuit is controlled by a separate circuit breaker. The number of outlets and fixtures assigned to each area circuit are governed by various federal, state, and local building codes. However, in most wiring scenarios, an area circuit typically contains less than ten outlets and fixtures in combined total.

It has long been known that data can be transmitted through power wire cables, while electricity is simultaneously being transmitted through those same cables. This is accomplished by transmitting low voltage signals at high frequencies, i.e. frequencies over 100 KHz. The transmission of the data has no appreciable effect upon the transmission of electricity and vice versa.

Transmitting data through power lines has been used for computer networking and even for telephone communication wiring. However, data transmission through power cables has primarily been used to control smart outlets, wherein the outlets can be activated or deactivated using a data transmission. In such systems, the control signals are typically generated using a desktop computer. The desktop computer uses a signal converter to convert command signals into data signals that can travel through the power lines. Since data is being transmitted through active power lines, the installation and expense of installing such systems is considerable. Furthermore, commercially available smart outlets are very expensive. This is due to the electronics required within the smart outlet to identify that outlet to the overall system. A typical home may have over one hundred outlets and dozens of lighting fixtures. Being able to place an expensive smart outlet into such a multitude has made such prior art systems too expensive and too complex for use by the average homeowner. Accordingly, smart outlets are typically only installed by professionals in luxury homes and ultra-high energy efficient commercial buildings.

A need therefore exists for a system and method of simplifying the use of smart outlets so that an average homeowner can afford to use the smart outlets and has the ability to install the smart outlets. This need is met by the present invention as described and claimed below.

SUMMARY OF THE INVENTION

The present invention is a system for adding controls to an area circuit within a building. The system enables specific outlets and fixture switches in the area circuit to be automatically and individually controlled.

In the system, smart outlets are used. Each smart outlet has a receptacle, an internal on/off switch, and a selectively changeable address code. Likewise, smart fixture switches are used. Each smart fixture switch has an internal on/off switch, and a selectively changeable address code.

An electrical power cable extends throughout the area circuit providing power to the various smart outlets and smart fixture switches. The smart outlets only conduct electricity to their receptacles when their internal on/off switches are "on". Likewise, the fixture switches are only capable of passing electricity when their internal on/off switches are turned "on".

A control unit is coupled to the electrical power cable at a point in the circuit before the first smart outlet or smart fixture switch. The control unit generates an addressed control signal within the electrical power cable. The addressed control signal selectively controls the internal on/off switches in the smart outlets and the smart fixture switches. However, the addressed control signal generated by the control unit must be properly addressed to a smart outlet or a smart fixture switch in order for that smart outlet or smart fixture switch to respond. By changing the address codes associated with each smart outlet and smart fixture switch, different elements of an area circuit can be controlled using a single command signal. Likewise, many different elements can be controlled using different command signals.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system can be embodied in many ways, the embodiments illustrated show the system being used in the wiring of a typical residential home. These embodiments are selected in order to set forth the best modes contemplated for the invention. The illustrated embodiment, however, is merely exemplary and should not be considered a limitation when interpreting the scope of the appended claims.

Figure 1:
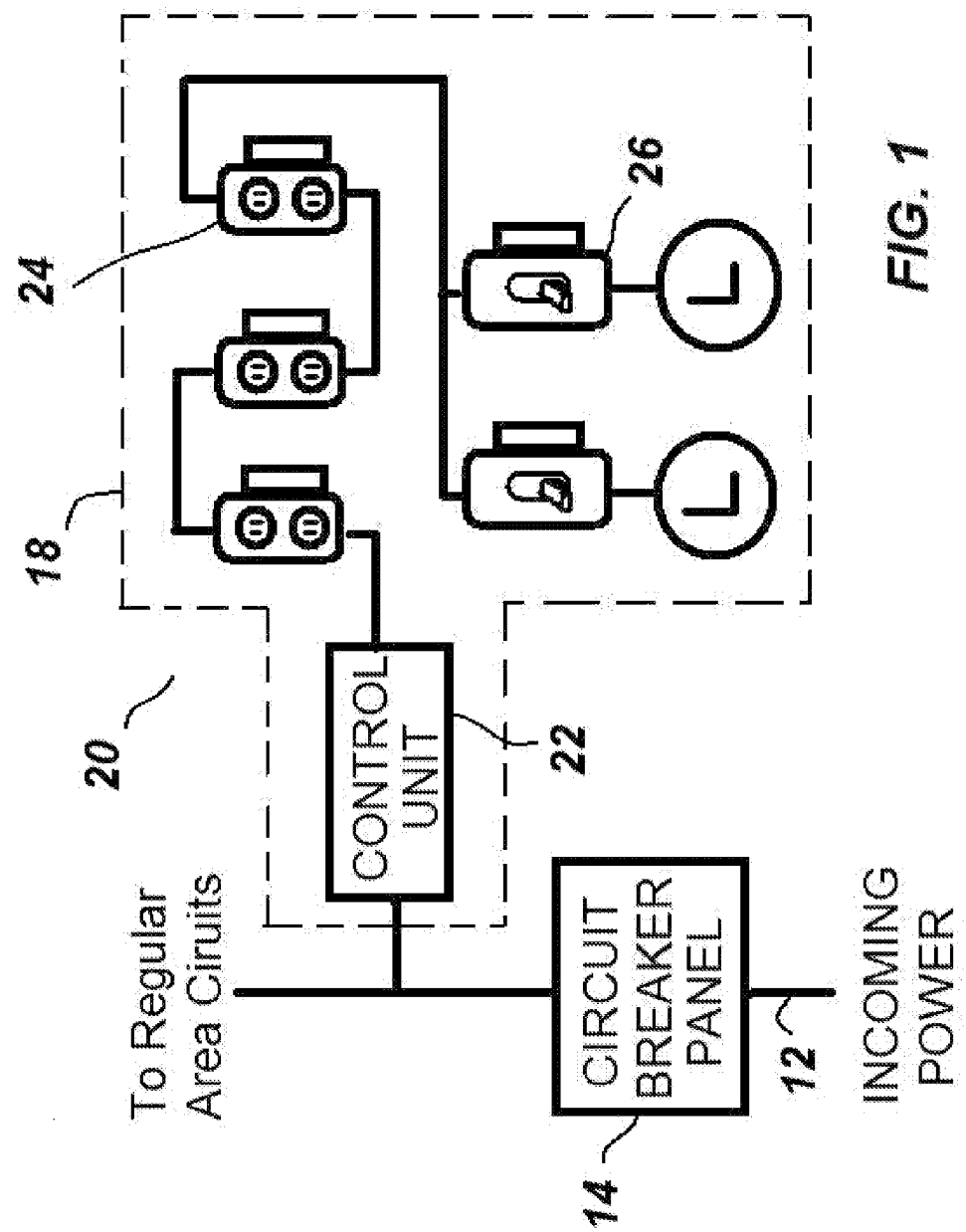
FIG. 1 is a general schematic of an exemplary embodiment of the overall system.

Referring to FIG. 1, a schematic for the wiring of a typical residential home is shown. As can be seen, the home receives power through electrical power cables 12 that run to the house 10 from a local power utility. The electrical power cables 12 run into a main circuit breaker panel 14. The circuit breaker panel 14 contains multiple circuit breakers. Each circuit breaker controls a specific area circuit 18 within the home 10.

The present invention system 20 includes the use of a control unit 22, smart outlets 24 and smart fixture switches 26 that enable each individual circuit to be separately programmed and controlled.

Figure 2:
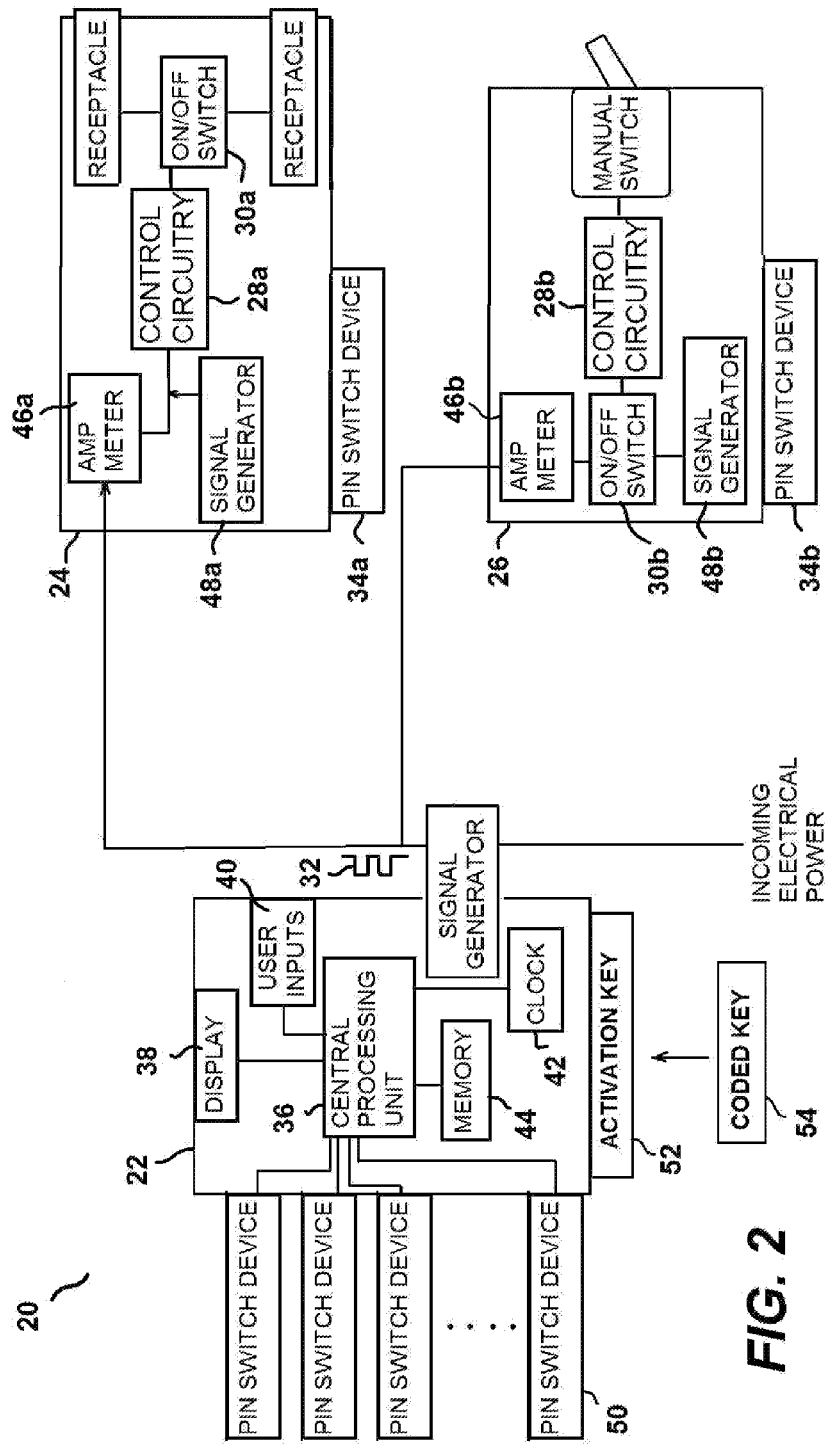
FIG. 2 is a more detailed schematic showing the electronic components utilized in the elements of the present invention system.

Referring to both FIG. 1 and FIG. 2, it can be seen that a control unit 22 is provided for each area circuit 18 within the home. The control unit 22 is placed in series between the primary circuit breaker panel 14 and the first smart outlet 24 or smart fixture switch 26 in that area circuit 18. The control unit 22 generates control signals to operate the various smart outlets 24 and smart fixture switches 26 present in that area circuit 18. The control unit 22 also prevents reply signals or looped signals from passing back into the main wiring and affecting other area circuits 18.

Each smart outlet 24 and smart fixture switch 26 contains control circuitry 28a, 28b that controls an internal on/off switch 30a, 30b. The control circuitry 28a, 28b responds to command signals 32 sent by the control unit 22, provided those command signals 32 are addressed to the smart outlet 24 or smart fixture switch 26. The address of each smart outlet 24 and each smart fixture switch 26 is determined by the use of a set of pin switches 34a, 34b. Although the use of pin switches 34a, 34b is illustrated, other code setting devices, such as memory cards or ID chips can be used. The use of pin switches 34a, 34b is preferred because of the ease in changing between preset codes.

In addition to an internal on/off switch 30a, 30b, each smart outlet 24 and smart fixture switch 26 also preferably contains a current meter 46a, 46b and a signal generator 48a, 48b that enables the smart outlets 24 and the smart fixture switches 26 to send signals back to the control unit 22.

Each control unit 22 contains its own central processing unit (CPU) 36. The CPU 36 is coupled to a display 38 and to the user inputs 40. The display 38 and user inputs 40 enable a user to interact with program control software being run by the control unit 22. The program control software provides two program functions to each of the smart outlets 24 and/or smart fixture switches 26 connected to the area circuit 18. The first program function is for the on/off control of each smart outlet 24 or smart fixture switch 26. Using this program function, a user can immediately send a signal to a specific smart outlet 24 or smart fixture switch 26 that causes that device to immediately turn either on or off. Similarly, using a clock 42 and memory 44 that are coupled to the CPU 36, a user can program specific times that each smart outlet 24 and each smart fixture switch 26 can be activated or be deactivated. It will therefore be understood that a user can turn on/off lights, appliances or any other electrical item that is either plugged into a smart outlet 24 and/or wired to a smart fixture switch 26.

The second program function is used for power monitoring. Each smart outlet 24 contains an amp meter 46. The amp meter 46 measures how much current is presently flowing through the smart outlet 24 or smart fixture switch 26. The current flow is converted into a data signal by the control circuitry 28a, 28b. The data signal is then sent back to the control unit 22 using signal generators 48a, 48b in the smart outlets 24 and smart fixture switches 26.

It will therefore be understood that a user can go to the control unit 22 and display how much electrical current is passing through a particular outlet or switch. In this manner, a person can calculate the costs of running various appliances, fixtures and other electrical items.

As can be seen, the control unit 22 contains a plurality of pin switch devices 50. Although, only a few are illustrated, it is preferred that each control unit 22 have up to ten pin switch devices 50. Each pin switch device 50 is set to a unique identification code that is shared by either one of the smart outlets 24 and/or one of the smart fixture switches 26 in the same area circuit 18 as the control unit 22. If a pin switch device 50 on the control unit 22 is set to the same identifier code as a pin switch device 34a, 34b in a smart outlet 24 or smart fixture switch 26, then the control unit 22 is capable of communicating with that smart outlet 24 or smart fixture switch 26 and vice versa. Furthermore, it should be understood that more than one smart outlet 24 or smart fixture switch 26 can be set to the same identification code. If this is done, all the smart outlets 24 and smart fixture switches 26 set to the same code will turn on together and off together upon the sending of a single command signal 32 from the control unit 22.

Optional safety features can be added to the control unit 22. The control unit 22 can have a key slot 52 that is configured to receive a removable activation key 54. The various user inputs 40 can be used only when the removable activation key 54 is inserted into the key slot 52. Once the activation key 54 is removed, the settings programmed into the control unit 22 remain fixed until the activation key 54 is returned. In this manner, children, employees or other unauthorized personnel cannot change the settings for the control unit 22.

Figure 3:
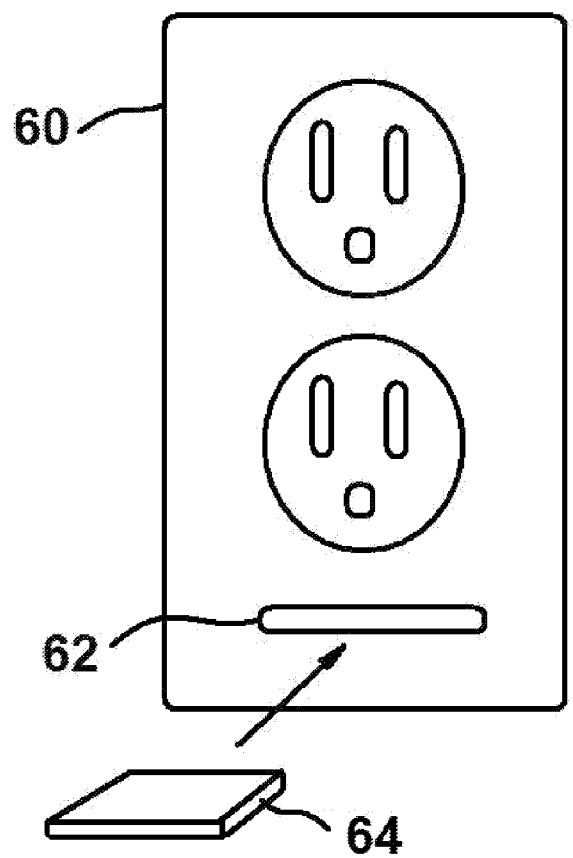
FIG. 3 is a front view of an alternate embodiment of a smart outlet for use in the present invention system.

In the first embodiment, the identification code associated with each smart outlet 24 or smart fixture switch 26 is determined by setting a pin switch device 50. To change the pin setting, the smart outlet 24 or smart fixture switch 26 would have to be removed from its junction box. Referring to FIG. 3, an alternate embodiment is shown that eliminates the use of pin switch devices and the need to remove the smart outlet or switch when changing its identification code.

In FIG. 3, each smart outlet 60 and each smart fixture switch (not shown) is provided with a key slot 62. A coded key 64 is provided that fits into the key slot 62. The coded key 64 contains the identification code for that smart outlet 60. Accordingly, the identification code for any smart outlet 60 or smart fixture switch can be changed simply by changing the coded key 64. The smart outlet 60 never has to be removed from its junction box. Furthermore, if the coded key 64 is removed by an unauthorized person, the smart outlet 60 will automatically deactivate.

In a similar manner, generic coded keys can be provided that activate the smart outlet 60 but make the smart outlet 60 unresponsive to the control unit 22. Rather, if a generic coded key is placed in a smart outlet 60, that smart outlet 60 is no longer "smart" and operates as a conventional hard-wired outlet.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. In a building having multiple circuits wired to a central circuit breaker, a system for adding controls to a targeted circuit from among said multiple circuits, said system comprising:

a plurality of outlet assemblies, wherein each of said plurality of outlet assemblies has a receptacle, an on/off switch, and a selectively changeable outlet identification code, wherein said on/off switch is configurable between an on condition and an off condition;

an electrical power cable extending from said central circuit breaker to said plurality of outlet assemblies, wherein said electrical power cable supplies electrical current to said plurality of outlet assemblies, and wherein said electrical current is connected to said receptacle in each of said plurality of outlet assemblies only when its said on/off switch is in said on condition; and a control unit coupled to said electrical power cable at a point between said plurality of outlet assemblies and said central circuit breaker, wherein said control unit generates an addressed control signal within said electrical power cable, wherein said addressed control signal selectively controls said on/off switch in any of said plurality of outlet assemblies that have said outlet identification code that is addressed by said addressed control signal.

2. The system according to claim 1, wherein each of said plurality of outlet assemblies contains a set of pin switches for selectively setting said outlet identification code for each of said plurality of outlet assemblies.

3. The system according to claim 2, wherein said control unit has at least one set of pin switches for selectively addressing said addressed control signal.

4. The system according to claim 1, wherein each of said plurality of outlet assemblies contains its own removable code key.

5. The system according to claim 1, wherein each of said plurality of outlet assemblies includes a current meter that measures current flow to said receptacle when said on/off switch is in said on condition.

6. The system according to claim 5, wherein each of said plurality of outlet assemblies includes a signal generator that sends a signal to said control unit through said electrical power cable.

7. The system according to claim 1, further including at least one fixture switch connected to said targeted circuit by said electrical power cable, wherein said at least one fixture switch is selectively activated and deactivated by said control unit.

8. The system according to claim 7, wherein said at least one fixture switch has a changeable identification code.

9. An area circuit within a building comprising:
  an outlet assembly having a receptacle, an on/off switch, and a selectively changeable outlet identification code, wherein said on/off switch is configurable between an on condition and an off condition;
  a control unit coupled to said outlet assembly by an electrical power cable, wherein said control unit generates an addressed control signal within said electrical power cable that selectively controls said on/off switch in said outlet assembly only when said outlet identification code is accurately addressed by said addressed control signal.

10. The system according to claim 9, wherein said outlet assembly contains a set of pin switches for selectively setting said outlet identification code.

11. The system according to claim 10, wherein said control unit has a set of pin switches for selectively addressing said addressed control signal.

12. The system according to claim 9, wherein said outlet assembly contains its own removable code key.

13. The system according to claim 9, wherein each said outlet assembly includes an amperage meter that measures current flow to said receptacle when said on/off switch is in said on condition.

14. The system according to claim 13, wherein said outlet assembly includes a signal generator that sends a signal from said amperage meter to said control unit through said electrical power cable.

15. The system according to claim 9, wherein said area circuit further includes at least one fixture switch that is connected to said control unit by said electrical power cable and wherein said at least one fixture switch is selectively activated and deactivated by said control unit through said electrical power cable.

16. The system according to claim 15, wherein said at least one fixture switch has a selectively changeable identification code.

\* \* \* \* \*